United States Patent

Greveling et al.

[11] Patent Number: 5,970,196
[45] Date of Patent: Oct. 19, 1999

[54] FIBER OPTIC PROTECTIVE MEMBER WITH REMOVABLE SECTION TO FACILITATE SEPARATION THEREOF

[75] Inventors: Johannes Ian Greveling, Clemmons, N.C.; Matthew S. Robinson, Saskatoon, Canada

[73] Assignee: Siecor Corporation, Hickory, N.C.

[21] Appl. No.: 08/935,373

[22] Filed: Sep. 22, 1997

[51] Int. Cl.[6] ................................................. G02B 6/44
[52] U.S. Cl. ........................ 385/114; 385/100; 385/106; 385/107; 385/109; 385/110; 385/112; 385/113
[58] Field of Search .................................. 385/100, 105, 385/106, 109, 110, 112, 113, 114, 115, 107

[56] References Cited

U.S. PATENT DOCUMENTS

| | | | |
|---|---|---|---|
| 3,076,235 | 2/1963 | Rollins et al. | 18/59 |
| 4,248,824 | 2/1981 | Hattop | 264/171 |
| 4,456,331 | 6/1984 | Whitehead et al. | 350/93.23 |
| 4,467,138 | 8/1984 | Brorein | 174/115 |
| 4,707,074 | 11/1987 | Heywood | 350/96.23 |
| 4,913,515 | 4/1990 | Braunmiller et al. | 350/96.23 |
| 5,067,830 | 11/1991 | McAlpine et al. | 385/114 |
| 5,155,789 | 10/1992 | Noane et al. | 385/106 |
| 5,268,983 | 12/1993 | Tatarka et al. | 385/106 |
| 5,281,764 | 1/1994 | King et al. | 174/112 |
| 5,401,908 | 3/1995 | Rodeghero | 174/112 |
| 5,442,722 | 8/1995 | DeCarlo | 385/114 |
| 5,468,914 | 11/1995 | Falciglia et al. | 174/112 |
| 5,509,097 | 4/1996 | Tondi-Resto et al. | 385/113 |
| 5,524,164 | 6/1996 | Hattori et al. | 385/114 |
| 5,598,498 | 1/1997 | Comezzi | 385/114 |
| 5,602,953 | 2/1997 | Delage et al. | 385/101 |
| 5,636,308 | 6/1997 | Personne et al. | 385/102 |
| 5,717,805 | 2/1998 | Stulpin | 385/114 |
| 5,737,470 | 4/1998 | Nagano et al. | 385/114 |
| 5,802,231 | 9/1998 | Nagano et al. | 385/114 |

FOREIGN PATENT DOCUMENTS 2179470A  6/1986  United Kingdom ............... 385/114 X

*Primary Examiner*—Brian Healy
*Attorney, Agent, or Firm*—Timothy J. Aberle

[57] ABSTRACT

An optical fiber carrier (10) having at least one protective member comprising a buffer tube (20). Buffer tube (20) has a removable section (30) removal of which permits separation of the buffer tube for access to optical fibers (42) in the tube. Buffer tube (20) may include an optical fiber ribbon (41) with a removable section (50) for facilitating separation of a protective member (48).

40 Claims, 4 Drawing Sheets

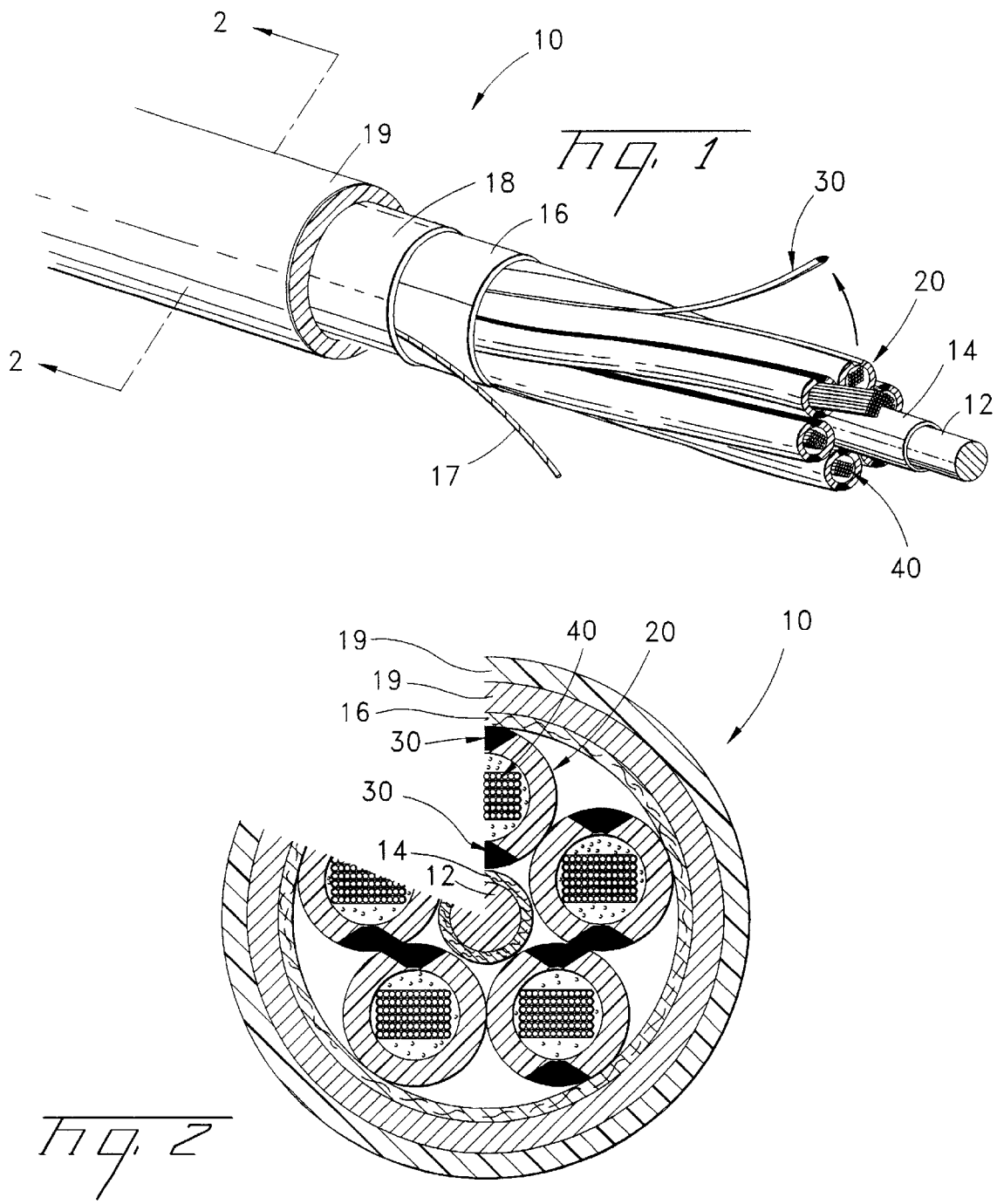

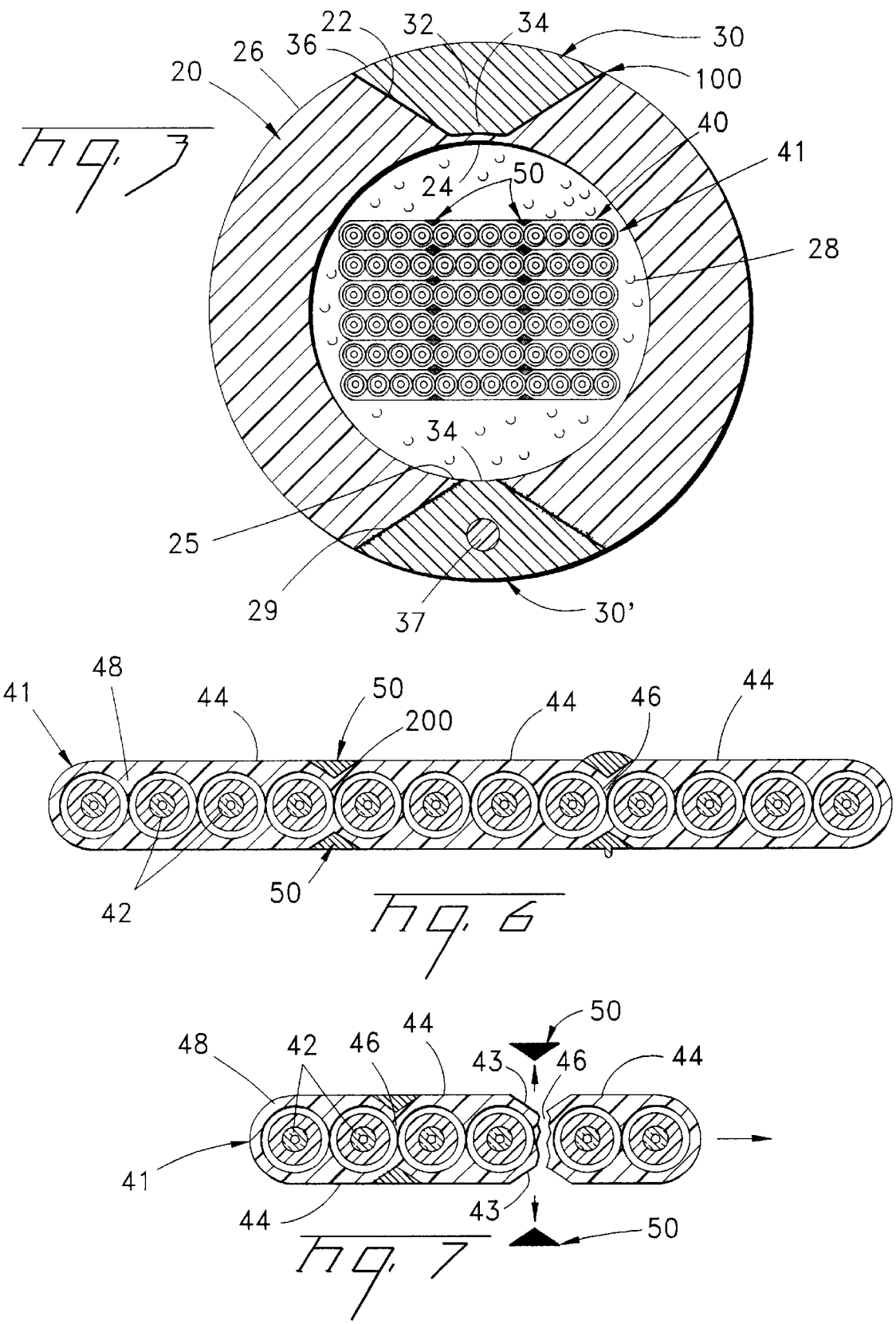

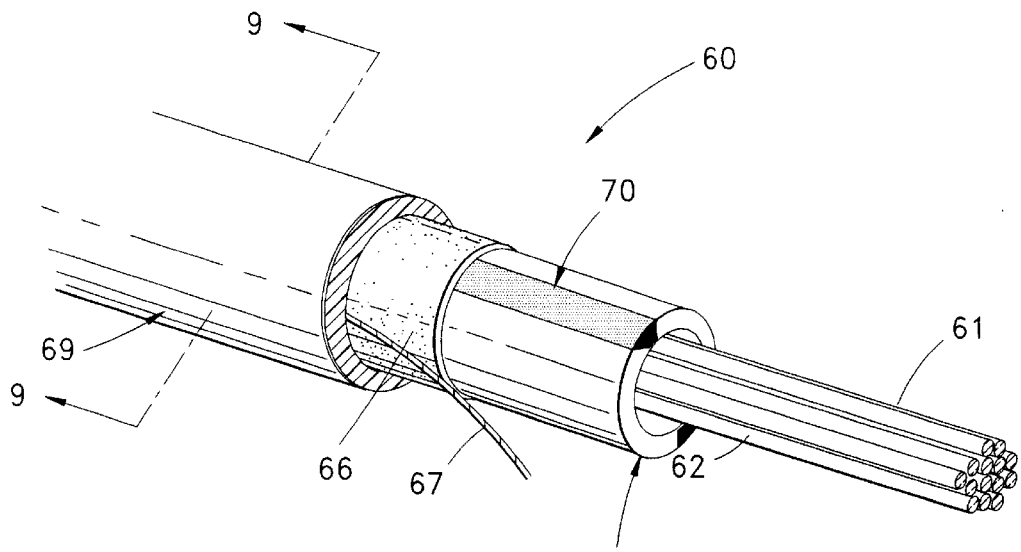
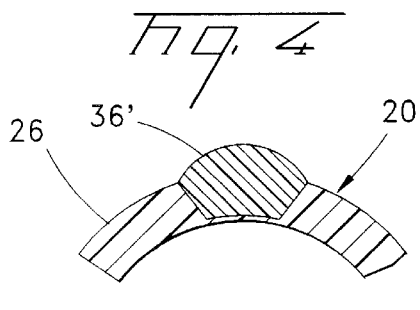
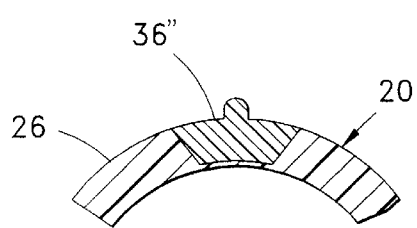
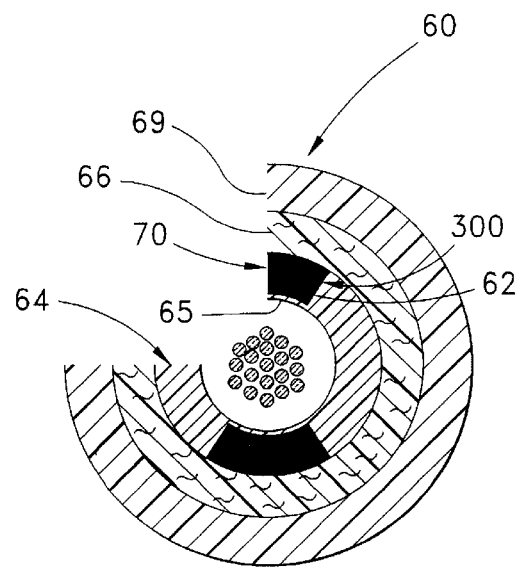

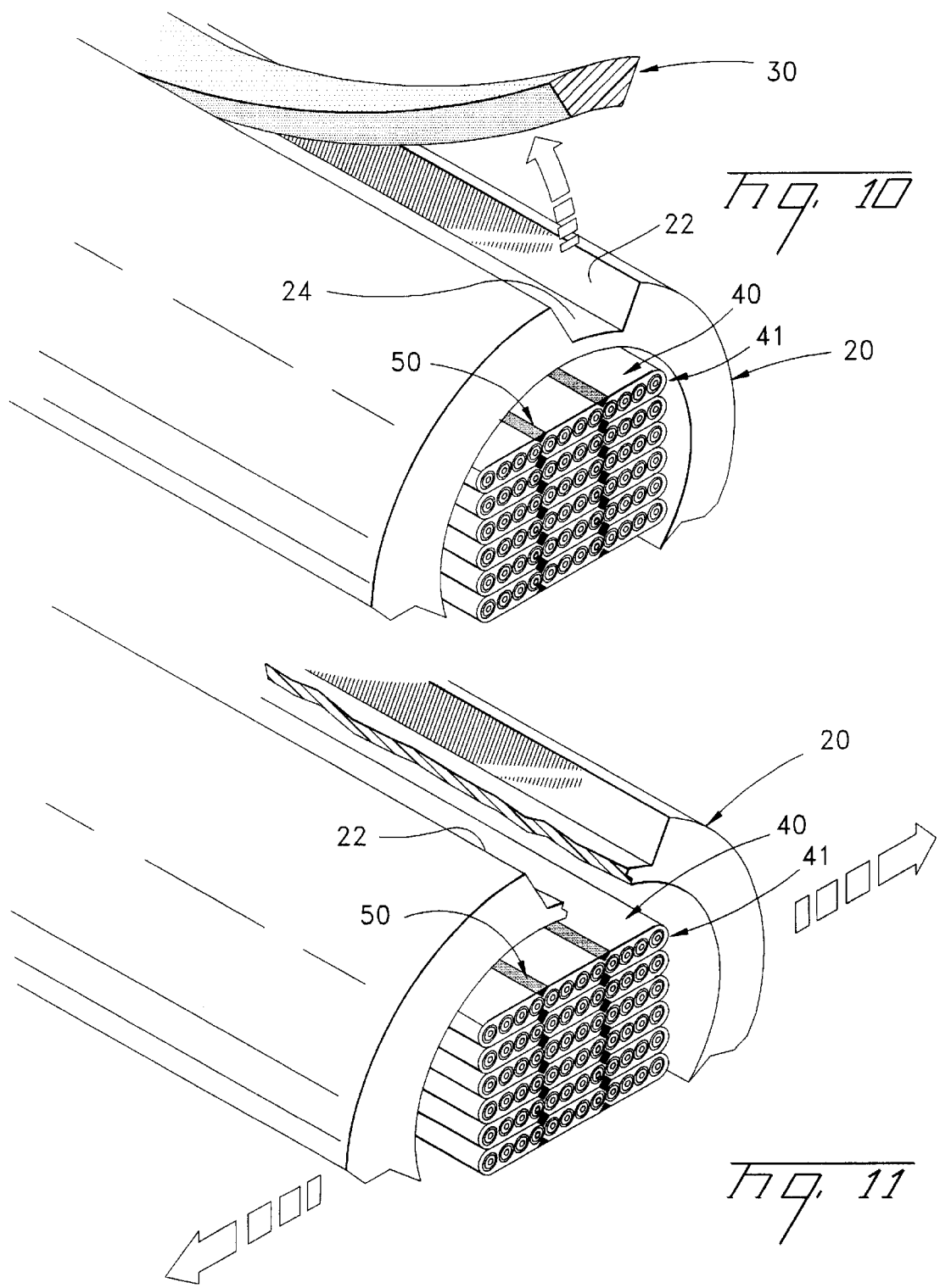

FIBER OPTIC PROTECTIVE MEMBER WITH REMOVABLE SECTION TO FACILITATE SEPARATION THEREOF

The present invention relates to optical fiber carriers, and, more particularly, to optical fiber carriers in the form of a fiber optic cable or optical fiber ribbon, which carriers include an optical fiber protective member.

Conventional optical fiber carriers comprise optical fibers which transmit information. Such carriers are used to transmit voice, video, and data information. Two common types of optical fiber carriers are fiber optic cable and optical fiber ribbon. Fiber optic cables may include optical fiber protective members comprising buffer tubes. An optical fiber ribbon, often disposed within a buffer tube, includes an optical fiber protective member comprising a common matrix coating. To gain access to the optical fibers in a buffer tube, an outer surface of the buffer tube must be separated. To separate ribbons into optical fiber groups, the common coating matrix must be separated. In either event, the protective member should be separated in a way that does not risk damage to the optical fibers therein.

Buffer tubes are extruded cylindrical tubes which enclose optical fibers in the cable. Buffer tubes serve many purposes, for example: providing physical protection to the fibers; protecting the fibers from contaminants; containing water blocking materials; isolation of the fibers into groups; strengthening the cable to resist crushing forces; and providing room for fibers to move during cable bending and when tension is applied to the cable. An example of a fiber optic cable which incorporates buffer tubes is an ALTOS™ cable manufactured by the SIECOR Corporation of Hickory, N.C. Such a cable includes flexible tubes for ease of routing the cable buffer through enclosures. Through the use of an access tool, a craftsperson accesses optical fibers in a given buffer tube. An access tool typically has embedded knives which cut the tube as the tool is pulled along the tube surface. The procedure of cutting the buffer tube to access the fibers therein is generally time consuming, as it is done carefully to avoid damage to the optical fibers. The tool which is used to cut the buffer tube is a specialized buffer tube access tool which requires special training for operators. Moreover, expenditures must be made to keep an inventory of the specialized tools, blades, etc. on hand.

A buffer tube which avoids the special training and tool inventory problems associated with buffer tube access tools is disclosed in U.S. Pat. No. 4,707,074. However, this known buffer tube requires a tube wall having sections of reduced wall thickness. The sections of reduced wall thickness are designed to weaken the buffer tube so that the section of reduced wall thickness can be separated by a craftsperson in order to gain access to the fibers therein. Disadvantageously, however, the weakened wall sections can be inadvertently separated by stress concentrations in the weakened wall sections due to tensile or compressive forces acting on the fiber optic cable. Where this occurs, the buffer tube is subject to the ingress of water or contaminants, and the passage of water blocking gel or even optical fibers out of the tube. Moreover, breach of the tube affects its mechanical strength whereby the tube may become crushed or distorted, and may diverge from its direction of lay, thereby subjecting the optical fibers therein to macrobending and microbending.

As noted above, an optical fiber ribbon, often disposed within a buffer tube, includes a protective member comprising a common matrix coating. A known optical fiber ribbon having a common matrix coating is disclosed in U.S. Pat. No. 5,598,498. This known ribbon requires a wire embedded in the common matrix coating between optical fiber groups. When it is desired to breach the protective member and separate the ribbon into distinct optical fiber groups, a procedure is employed whereby direct tensile force is exerted on the wire towards the outside of the ribbon while keeping the wire stretched perpendicularly to the axis of the fibers and to the ribbon surface. This procedure, however, may subject the optical fibers to damage.

OBJECT OF THE INVENTION

In view of the foregoing, it is an object of the present invention to provide an optical fiber carrier having a protective member which is mechanically robust, and allows the separation thereof without damage to the optical fibers therein.

It is a further object of the present invention to provide an optical fiber carrier with an optical fiber protective member, the optical fiber protective member protecting at least one optical fiber and including a removable section whereby removal of the removable section exposes a frangible section for separation of the protective member.

It is yet another object of the present invention to provide an optical fiber carrier with an optical fiber protective member protecting at least one optical fiber, the removable section including a raised gripping surface whereby gripping of the raised gripping surface enhances removal of the removable section.

It is a further object of the present invention to provide a protective member in the form of a robust buffer tube, the buffer tube having a removable section for gaining access to fibers in the buffer tube.

It is a further object of the present invention to provide a protective member in the form of a common matrix coating of an optical fiber ribbon, the protective member having a removable section for facilitating separation of the ribbon into fiber groups.

It is another object of the present invention to provide an optical fiber carrier comprising a fiber optic cable having a protective member in the form of a robust buffer tube with a removable section for gaining access to fibers in the buffer tube, and within the buffer tube, a protective member in the form of a common matrix coating of an optical fiber ribbon, the protective member having a removable section for facilitating separation of the ribbon into distinct fiber groups.

SUMMARY OF THE INVENTION

In achieving the foregoing objects, the present invention comprises an optical fiber carrier comprising an optical fiber protective member, the optical fiber protective member protecting at least one optical fiber and including a removable section whereby removal of the removable section exposes a frangible section for separation of the protective member. The removable section may include a raised gripping surface whereby gripping of the raised gripping surface enhances removal of the removable section for access to the at least one optical fiber. The optical fiber carrier may include a second optical fiber carrier therein having a second removable section whereby removal of the second removable section exposes a frangible section for separation of the second optical fiber carrier into optical fiber groups.

BRIEF DESCRIPTION OF THE DRAWINGS

FIG. 1 is an isometric view of an outdoor-type fiber optic cable having buffer tubes and optical fiber ribbons according to the present invention.

FIG. 2 is a partial cross section of the fiber optic cable of FIG. 1 taken across line 2—2.

FIG. 3 is a cross section of an embodiment of a buffer tube and ribbons according to the present invention.

FIG. 4 is a cross section of another embodiment of the buffer tube of FIG. 3 according to the present invention.

FIG. 5 is a cross section of a further embodiment of the buffer tube of FIG. 3 according to the present invention.

FIG. 6 is a cross section of a 12-fiber ribbon according to the present invention.

FIG. 7 is a cross section of a 6-fiber ribbon according to the present invention.

FIG. 8 is an isometric view of an indoor-type fiber optic cable having a buffer tube according to the present invention.

FIG. 9 is a partial cross section of the fiber optic cable of FIG. 8 taken across line 9—9.

FIG. 10 is an isometric view of a buffer tube of FIG. 1 with a removable section being removed to expose an intact frangible web section.

FIG. 11 is an isometric view of the buffer tube of FIG. 10 with the frangible web section separated.

DETAILED DESCRIPTION OF THE INVENTION

Referring to FIGS. 1–2 an outdoor-type fiber optic cable 10 according to the present invention will be described. Fiber optic cable 10 includes a dielectric central member 12 surrounded by a water swellable material 14. Protective members comprising buffer tubes 20 are disposed about material 14, and buffer tubes 20 include a respective stack 40 of ribbons therein. Buffer tubes 20 are surrounded by a water swellable tape 16, which, in turn, is surrounded by a dielectric strength member 18 and an outer jacket 19. A ripcord 17 is interposed between tape 16 and strength member 18. Buffer tubes 20 are respectively provided with at least one removable section 30 for facilitating the separation of the tube for gaining access to the optical fibers therein.

Referring to FIG. 3, a buffer tube 20 according to the present invention will be further described. Buffer tube 20 includes one or more separation areas comprising trough sections 22 disposed between an inner surface 25 and an outer surface 26. A frangible section comprising a web section 24 extends across trough section 22. The thickness of the frangible section may be up to about 20% of the thickness of the buffer tube wall. A water blocking material 28 may be disposed in buffer tube 20.

Removable sections 30 are respectively removably attached to trough sections 22 at an interface area 100. Removable sections 30 may extending helically or longitudinally with respect to buffer tube 20. Interface area 100 comprises an area of surface contact and adhesion between the respective surfaces of the removable and trough sections. This adhesion is strong enough to maintain crush strength in buffer tube 20, but also allows removal of removable section 30, i.e. removable section 30 is removably attached to trough section 22. The interface area 100 is in communication with an outer surface of tube 20 and represents a discontinuity in buffer tube 20. Removable sections 30 each include a respective body shape 32 which complements the shape of trough section 22, shape 32 preferably comprising a general V-shape when viewed in a transverse cross section. Removable sections 30 each include a relatively narrow area adjacent frangible web section 24, and an outer surface 36 adjacent and generally co-arcuate with outer surface 26.

Buffer tube 20 includes a stack of ribbons 40, each ribbon stack comprises individual optical fiber ribbons 41. As respectively shown in FIGS. 6 and 7, ribbons 41 may be a 12-fiber or a 6-fiber ribbon having individual optical fibers 42 disposed in an optical fiber protective member comprising a common matrix coating 48. Common matrix coating 48 may be a UV curable plastic or a thermoplastic material. Common matrix coating 48 includes removable sections 50 formed of a UV curable or thermoplastic material removably attached to common matrix coating 48 at respective interface areas 200 (FIG. 6). Optical fiber groups 44 are generally delineated by the position of opposing pairs of removable sections 50. Ribbons 41 include separation areas comprising trough sections 43, and frangible web sections 46 which extend between respective pairs of removable sections 50. Frangible web sections 46 comprise part of respective trough sections 43.

The present inventive concept also extends to a protective member which is part of an indoor-type fiber optic cable, for example, fiber optic cable 60 (FIGS. 8–9). Fiber optic cable 60 includes loose optical fibers 61 surrounded by a protective member comprising a buffer tube 64. Buffer tube 64 includes at least one removable section 70 removably attached to a separation area comprising a trough section 62. Trough section 62 includes a frangible section comprising a frangible web 65. An interface area 300 is defined between removable section 70 and trough section 62 (FIG. 9). Buffer tube 64 is surrounded by water swellable strength members 66 and a flame retardant jacket 69. A ripcord 67 is interposed between water swellable strength members 66 and jacket 69.

Manufacture of tubes 20,64 may be accomplished by co-extruding removable sections 30,70 as a part of respective tubes 20,64. An adaptable co-extrusion method and apparatus are taught in U.S. Pat. No. 4,248,824, which patent is hereby incorporated by reference in its entirety. Removable sections 30,70 are preferably made of a thermoplastic material and color which are different than the material and color of respective trough sections 22,62. For example, tubes 20,64 may comprise a polypropylene or polyester material of a first color, while respective removable sections 30,70 are made of a polybutelene terephthalate (PBT) or nylon material of a second color. Although the material of removable sections 30,50 is different with respect to the material of respective trough sections 22,62, there is sufficient contact surface area and adhesion between the respective materials of the removable and trough sections to prevent removable sections 30,70 from being inadvertently dislodged during stress on respective cables 10,60. The adhesion is enhanced by the broad surface contact areas of adhesion respectively defined by interface areas 100,300. Alternatively, instead of co-extruding, removable sections 30,70 may be bonded into place with a bonding agent, for example as shown in FIG. 2, where removable section 30' is bonded in a complementary trough section by a bonding agent 29 disposed in interface area 100. Bonding agent 29 may comprise, for example, a conventional hot melt adhesive or an epoxy resin. Bonded removable sections may comprise round or rectangular shapes. In the event removable sections 30,70 are bonded with a bonding agent, they may be the same material as trough sections 22,62. The combined thicknesses of and adhesion between removable sections 30,70 and respective trough sections 22,62 create a robust wall in respective buffer tubes 20,64.

Manufacture of ribbons 41 may be accomplished by co-extrusion of common matrix coating 48 and removable sections 50. The UV curable or thermoplastic materials chosen for the trough and removable sections 43,50, e.g. a UV curable acrylate and nylon, define an interface area 200 which permits removable attachment of removable sections 50. Alternatively, removable sections 50 may be bonded in respective trough sections 43 with a bonding agent comprising, for example, a conventional hot melt adhesive or an epoxy resin.

During use of fiber optic cables 10,60, tensile or compressive loads placed on the cable may result in stress in buffer tubes 20,64. Stress may be placed on buffer tubes 20,64 in the vicinity of and directly on removable sections 30,70 and their complementary trough sections. However, tubes 20,64 will not be inadvertently separated when respective cables 10,60 experience stress. This is because removable sections 30,70 and their complementary trough sections are connected by a broad area of adhesion defined by interface areas 100,300. The adhesion in interface areas 100,300 permits stress distribution between removable sections 30,70 and trough sections 22,62. The distribution of stress advantageously avoids stress concentrations in tubes 20,60 which might otherwise break or buckle the tubes when stress is acting on fiber optic cables 10,60.

When it is desired to access optical fibers in the cable, a craftsperson grips removable section 30,70 with an ordinary pair of pliers or other instrument and pulls removable section 30,70 away from tube 20,64 to the desired length (FIGS. 1 and 10). The removal of removable section 30,70 results in the exposure of a reduced wall thickness of respective tube 20,60, which reduced wall thickness comprises a respective frangible web section 24,65. To aid in gripping the removable section, the removable section 30,50,70 can be modified to include a ripcord filament 37 (FIG. 3), a raised surface 36' (FIG. 4), or a surface 36" with a tab (FIG. 5). Next, web section 24,65 is separated and buffer tube 20,60 is easily opened to gain access to ribbons 41 or fibers 62 (FIG. 11). Alternatively, removable section 30,70 can extend through the tube wall, for example, surface 34 of removable section 30' extends to inner surface 25 of tube 20, thereby eliminating web section 24 (FIG. 3). Removable sections 50 of ribbon 41 can be removed with a sharp tool, frangible web 46 then separated, and an optical fiber group 44 moved away (FIG. 7).

The present invention has thus been described with reference to the foregoing embodiments, which embodiments are intended to be illustrative of the inventive concept rather than limiting. Persons of skill in the art will appreciate that variations and modifications may be made without departing from the scope of the appended claims. Although the invention has been described with reference to a ribbon having one protective member, the scope of the appended claims includes ribbons having more than one protective member, such as is disclosed in U.S. Pat. No. 5,524,164. Additionally, any of the protective members may have a layer of material extruded therearound to prevent inadvertent dislodging of a removable section.

We claim:

1. An optical fiber carrier, comprising:
   an optical fiber protective member, said protective member protects at least one optical fiber, said protective member having a trough section;
   a removable section received in said trough section and forming an interface area between said removable section and said trough section;
   said interface area comprising adhesion between said trough and removable sections whereby at least a portion of said removable section can be removed, out of said trough section, to facilitate separation of said protective member.

2. The optical fiber carrier of claim 1, wherein said trough and removable sections comprise dissimilar material characteristics whereby said interface area permits removable attachment of said removable section with respect to said trough section.

3. The optical fiber carrier of claim 1, wherein said trough section comprises a frangible web section.

4. The optical fiber carrier of claim 1, wherein said interface area is in communication with a portion of the outer surface of the protective member.

5. The optical fiber carrier of claim 1, wherein when said removable section is in said trough section said protective member comprises a generally uniform thickness, as said removable section is removed a reduced thickness is defined.

6. The optical fiber carrier of claim 5, wherein said reduced thickness comprises a frangible web.

7. The optical fiber carrier of claim 1, wherein said protective member comprises a buffer tube.

8. The optical fiber carrier of claim 1, wherein said protective member comprises a common matrix coating of an optical fiber ribbon.

9. The optical fiber carrier of claim 1, wherein said interface area adhesion is formed by co-extrusion of said trough and removable sections.

10. The optical fiber carrier of claim 1, wherein the protective member comprises a raised surface for gripping the removable section.

11. The optical fiber carrier of claim 1, wherein said removable section is a different color than the protective member.

12. The optical fiber carrier of claim 1, wherein said removable section is bonded to said trough section with an adhesive material.

13. An optical fiber carrier, comprising:
   (a) a first optical fiber protective member, said first optical fiber protective member protecting at least one optical fiber;
   (b) said first optical fiber protective member having a first separation area;
   (c) said first separation area comprises a frangible section;
   (d) said first optical fiber protective member further includes a first removable section, said first removable section being removably attached to said first separation area;
   (e) whereby, removal of said first removable section exposes said first frangible section.

14. The optical fiber carrier of claim 13, wherein said optical fiber carrier includes:
   a second optical fiber carrier;
   said second optical fiber carrier comprises a second optical fiber protective member which protects a plurality of optical fibers;
   said second protective member having a separation area, said separation area comprises a frangible section; said second optical fiber protective member comprises a second removable section, said second removable section being removably attached to said second separation area; whereby, removal of said second removable section exposes said second frangible section.

15. The optical fiber carrier of claim 13, wherein said second optical fiber carrier is disposed within said first optical fiber protective member.

16. An optical fiber carrier, comprising:
   (a) an optical fiber protective member, said optical fiber protective member protecting at least one optical fiber, said optical fiber protective member having a separation area;

(b) said optical fiber protective member further includes a removable section removably attached to said separation area, said removable section includes a raised gripping surface;

(c) whereby, gripping of said raised gripping surface enhances removal of said removable section for access to said at least one optical fiber.

17. The optical fiber carrier of claim 16, wherein said raised gripping surface comprises a tab.

18. An optical fiber carrier, comprising:
an optical fiber protective member, the optical fiber protective member protecting at least one optical fiber and including a removable section whereby removal of the removable section exposes a frangible section for separation of the protective member.

19. A buffer tube with at least one optical fiber therein, said buffer tube comprising:
a trough section formed in a wall of said buffer tube;
a removable section, said removable section disposed in said trough section, said removable section and said trough section cooperating to define a robust wall of said buffer tube;
an interface area in said wall at the interface of said trough and removable sections, said interface area providing surface contact and adhesion between respective surfaces of said trough and removable sections whereby said removable section is removable attached to said buffer tube, and removal of said removable section weakens said buffer tube.

20. The buffer tube of claim 19, wherein said trough and removable sections comprise dissimilar material characteristics.

21. The buffer tube of claim 19, wherein said trough section comprises a frangible web section.

22. The buffer tube of claim 19, wherein said interface area is in communication with a portion of the outer surface of the buffer tube.

23. The buffer tube of claim 19, wherein when said removable section is in said trough section said buffer tube comprises a generally uniform tube wall thickness, as said removable section is removed, a reduced tube wall thickness is defined.

24. The buffer tube of claim 23, wherein said reduced thickness comprises a frangible section.

25. The buffer tube of claim 19, wherein said interface area adhesion is formed by co-extrusion of said trough and removable sections.

26. The buffer tube of claim 19, wherein said trough section extends through a wall of said buffer tube.

27. The buffer tube of claim 19, wherein the buffer tube comprises a raised surface for gripping the removable section.

28. An optical fiber ribbon with optical fibers therein, said optical fiber ribbon comprising:
a protective member comprising a common matrix coating; a trough section formed in a surface of said common matrix coating;
a removable section disposed in said trough section; an interface area defined between said trough and removable sections, said interface area providing adhesion between said trough and removable sections, whereby said removable section is removable for separating said optical fiber ribbon into optical fiber groups.

29. The optical fiber ribbon of claim 28, wherein said trough and removable sections comprise dissimilar material characteristics whereby said interface area permits removable attachment of said removable section with respect to said trough section.

30. The optical fiber ribbon of claim 28, wherein said trough section comprises a frangible web section.

31. The optical fiber ribbon of claim 28, wherein said interface area is in communication with a portion of the outer surface of the optical fiber ribbon.

32. The optical fiber ribbon of claim 28, wherein when said removable section is in said trough section said protective member comprises a generally uniform thickness, as said removable section is removed, a reduced thickness is defined.

33. The optical fiber ribbon of claim 32, wherein said reduced thickness comprises a frangible web.

34. The optical fiber ribbon of claim 28, wherein said interface area adhesion is formed by co-extrusion of said trough and removable sections.

35. The optical fiber ribbon of claim 28, wherein the protective member comprises a raised surface for gripping the removable section.

36. A fiber optic cable comprising:
(a) a buffer tube with at least one optical fiber ribbon therein, said buffer tube including a trough section formed in a wall of said buffer tube; a removable section, said removable section disposed in said trough section, said removable section and said trough section cooperating to define a strengthened wall of said buffer tube; an interface area in said strengthened wall at the interface of said trough and removable sections, said interface area providing adhesion between said trough and removable sections whereby said removable section is removable from said buffer tube, thereby weakening said buffer tube in the area where the removable section was, and permitting access to said at least one optical fiber ribbon; and (b) said at least one optical fiber ribbon having a protective member comprising a common matrix coating; a matrix trough section formed in a surface of said common matrix coating; a matrix removable section disposed in said matrix trough section; a matrix interface area defined between said matrix trough and matrix removable sections, said interface area providing adhesion between said matrix trough and matrix removable sections, whereby said matrix removable section is removable for separating said optical fiber ribbon into optical fiber groups.

37. The fiber optic cable of claim 36, wherein at least some of said trough and removable sections comprise dissimilar material characteristics whereby said interface area permits removable attachment of said removable section with respect to said trough section.

38. The fiber optic cable of claim 36, wherein at least one of said trough sections comprises a frangible web.

39. The fiber optic cable of claim 36, wherein at least one of said interface areas comprises adhesion formed by co-extrusion of its respective said trough and removable sections.

40. The fiber optic cable of claim 36, wherein at least one protective member comprises a raised surface on a respective removable section for gripping thereof.

* * * * *